March 21, 1967  B. L. S. PHILLIPS  3,310,054
FILE CARD MARKER

Filed July 20, 1965  2 Sheets-Sheet 1

INVENTOR
BETTY LEE S. PHILLIPS

BY

ATTORNEYS

March 21, 1967 — B. L. S. PHILLIPS — 3,310,054
FILE CARD MARKER

Filed July 20, 1965 — 2 Sheets-Sheet 2

INVENTOR
BETTY LEE S. PHILLIPS

BY

ATTORNEYS

United States Patent Office 3,310,054
Patented Mar. 21, 1967

3,310,054
FILE CARD MARKER
Betty Lee S. Phillips, Gloucester Point, Va., assignor to the United States of America as represented by the National Aeronautics and Space Administration
Filed July 20, 1965, Ser. No. 473,537
2 Claims. (Cl. 129—16.7)

The invention described herein may be manufactured and used by or for the Government of the United States of America for governmental purposes without the payment of any royalties thereon or therefor.

This invention relates to a file card marker, and more particularly to a device for flagging punched-type business cards.

Business machine cards are utilized for a multitude of purposes, one of which is to keep a running inventory on the maintenance of laboratory equipment. To accomplish this, hundreds of cards must be filed according to chronological dates, location, etc. In order to use such cards in a property control operation, it is necessary to flag the cards to apprise the clerk of various categories of equipment. One difficulty encountered in flagging the cards is the use of a device which will not mutilate the card. This is important since a mutilated card cannot be read by a business machine. Thus, if the card is torn, changed in thickness, punched, it is no longer of value and must be replaced with a new card. Obviously, the punching of a new card is expensive and is time-consuming.

It is, therefore, apparent that many of the devices utilized for identifying folders, cards, etc., cannot be utilized to identify a business machine card. Obviously, a tab cannot be glued, stapled or otherwise directly fastened to the business machine card since it will mutilate the card upon removal, the card thereafter being rejected in a machine sort. It is apparent that the business machine card could be placed in various types of folders; however, the folders are expensive, very bulky when dealing with hundreds of cards, and the card is not particularly accessible when placed in the folder.

The invention here under consideration eliminates the difficulties discussed above providing a single piece file card marker through which the business card may be inserted. The marker is of approximately the same thickness as the business machine card eliminating the problem of the bulky folder. The card is readily insertable in the file card marker and can be inserted without mutilating the card. Likewise, the card can be removed for scanning by the business machine without damaging the card. No adhesive, stapling or other such technique is necessary to secure the marker with respect to the business machine card. A tab or raised portion of the marker is formed integral with the remainder of the device providing a means for ready identification of the particular business machine card.

It is, therefore, an object of this invention to provide a file card marker for business machines which provides a means for flagging the card without mutilating the card.

Still another object of the invention is to provide a file card marker which is economical to manufacture and maintain, is not bulky and is easily attached or removed from the business machine card.

These and other objects and advantages of the invention will become more apparent upon reading the specification in conjunction with the accompanying drawings.

Basically, this invention relates to a file card marker utilized with the filing of business machine cards. The marker consists of a single piece or blank of material which has a dimension greater than the width of the business machine card. The blank is provided with slits spaced from the edges of the blank and from each other. These slits are of a length slightly greater than the width of the business machine card such that the portion of the blank between the slits may be displaced from the remainder of the card allowing the business machine card to be inserted through the slits. A portion of the slits may be skewed to facilitate insertion of the business machine card. A raised or tabular portion is formed on the upper part of the marker providing a place of indentifying the marker and card.

Figure 1:
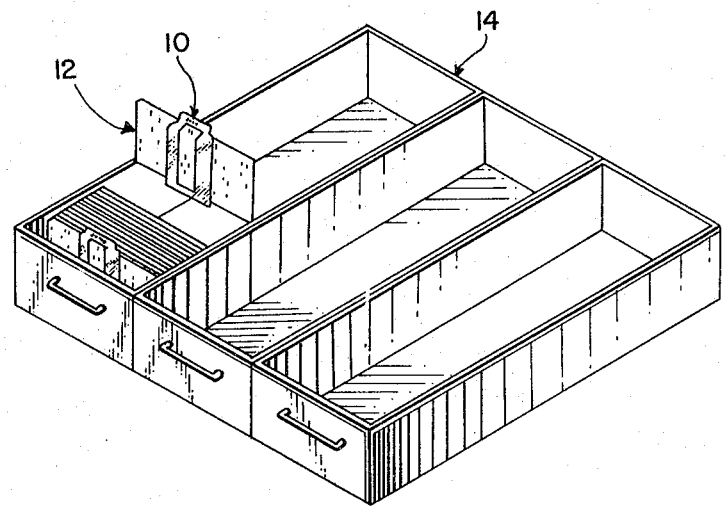
FIG. 1 is a perspective view of business machine card storage bins showing the business machine card with the attached marker filed and another business machine card with the attached marker in position for filing.
Figure 4:
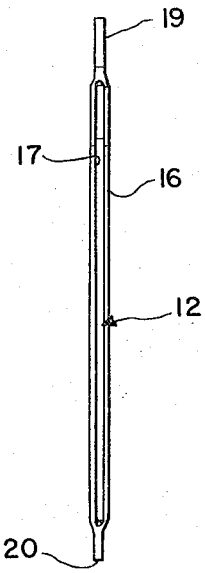
FIG. 4 is an end view of the file card marker shown in FIG. 3.
Figure 2:
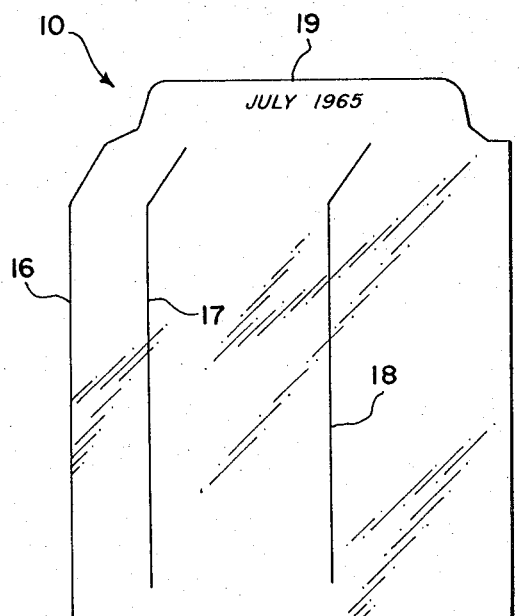
FIG. 2 is a side elevational view of the file card marker per se.

Referring now more specifically to the details of the invention, FIG. 1 shows the file card marker designated generally by the reference numeral 10, the business machine card 12 inserted in the card marker, and storage bins 14 constructed to receive the business machine cards with or without the file card marker.

The file card marker 10 is constructed from a card-like material of generally the same thickness or a little greater thickness than the business machine card which it is to receive. The card 10 has a body portion 16 having one dimension which is somewhat greater than the width of the business machine card which is to be attached thereto and another dimension considerably less than the length of the business machine card. Spaced inwardly from the edges of the card body 16 and from each other are slits 17 and 18. The slits 17 and 18 are cut completely through the card, and the upper portions of each slit skewed at an agle of approximately 30° with respect to the remainder of the slits. This arrangement facilitates insertion of the business card through the slits. The exact positioning of the slits 17 and 18 with respect to the sides of the body and to each other are not particularly critical; however, should be located so that substantial portions of the body are between the edges of the body and the slits and between the slits. The slits are also located parallel to each other and are of the same length so that the business machine card is positioned square with respect to the file card marker.

A portion of the body 10 is formed in the nature of a tab 19 which rises above the slits and the business machine card which might be inserted in the file card marker. A date or other identifying information may be typed on the tab. It should also be noted that a portion of the file card marker body 10 extends below the slits 17 and 18 forming a base 20. Thus, the marker of base 20 rests upon the bottom of the storage bins further preventing mutilation to the edges of the business machine cards.

Figure 5:
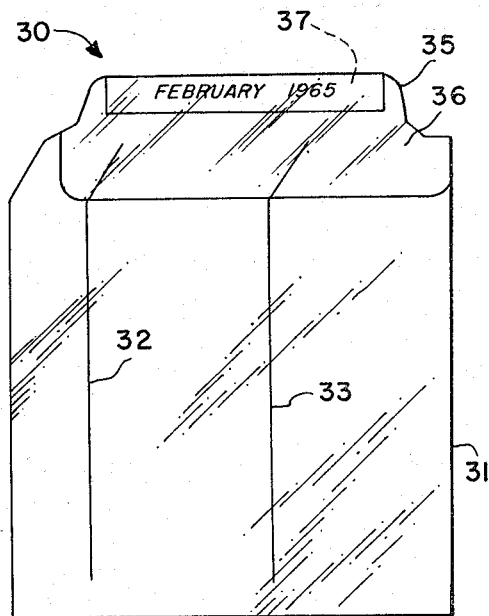
FIG. 5 is a modified form of file card marker.
Figure 3:
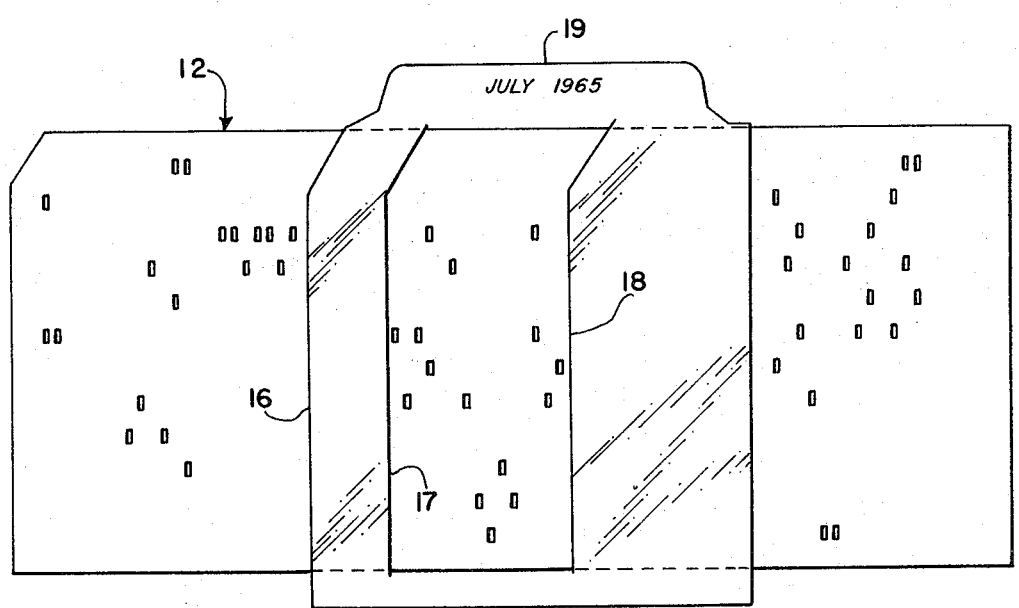
FIG. 3 is a side elevational view of the file card marker showing the business machine card inserted therein.

The file card marker 30, shown in FIG. 5, is a modified form of the file card marker 10. It has a body 31, slits 32 and 33, a base 34 and a tabular portion 35 similar to the previously described arrangement. It differs in that a transparent material 36, such as plastic, is wrapped around the tabular portion and fixed to the body in a conventional manner, such as by an adhesive. The upper portion of the cover, however, is not adhered to the tabular portion and provides a pocket wherein an identification plate 37 may be inserted. This type of tabular construction provides an arrangement whereby the identification on the file card marker may be readily changed by merely inserting a different identification plate, whereas, the identification plate is normally printed or typed on the tabular portion of the file card marker shown in the FIG. 3 embodiment.

The operation of the file card marker 10 and 30 is believed apparent from the above description. The particular identification for the file card marker is affixed thereto as described above. The particular business machine card to be flagged is then inserted in the marker by forcing the section of the marker body between the slits inwardly or outwardly and threading the business machine card between the slits and over or under the depressed portion as the case may be. The file card marker and the business machine card are then placed in the storage bins as is shown in FIG. 1.

It is believed apparent that the file card marker described herein may be utilized to flag a business machine card without mutilating the card. The card may be readily inserted or removed for machine sorting. Obviously, the file card marker is made of a minimum amount of material with little bulk. The combined file card marker and the business machine card can be filed in approximately the same area as the business machine card alone. Due to the simplicity of the file card marker, it can be made very economically and there is no maintenance involved. The file card marker can be used repeatedly by merely changing the identification on the tab. Furthermore, the file card marker can be made of different colors providing an additional means of identification for different categories of property control. Obviously, the slits can be placed in the file card markers at various angles to facilitate insertion of different types of business machine cards and the dexterity of the clerk in inserting and removing the card.

While a preferred embodiment of this invention has been described, it will be understood that modification and improvements may be made thereto. Such of these modifications and improvements as incorporate the principles of this invention may be considered as included in the hereafter appended claims unless these claims by their language expressly state otherwise.

What is claimed:

1. A business machine file card marker comprising: a generally rectangular marker; said marker constructed of a single, unfolded piece of material having uniform thickness throughout having a dimension which is greater than the width of a business card received thereby and a length that is a fraction of the length of the business machine card; said marker having a first slit starting above the marker bottom and terminating below the marker top the major portion of which is perpendicular to the bottom of the marker; a similar second slit spaced from said first slit and being parallel thereto; said slits being of sufficient dimension to receive a business card without damaging the edges yet capable of holding a business card snugly; said slits having a portion thereof near at least one of the ends of the slits skewed to facilitate insertion of a business card; said slits being spaced inward from the edges of the marker so that edge portions of the marker are located in front of an inserted business card and the center portion in back of an inserted business card or vice versa depending on how the card is inserted; said marker being placeable at any position along the length of a business machine card permitting the edge portions of adjacent staggered markers to overlap and occupy the same area; and tab means formed integral with the marker adapted to project above an inserted business machine card for identification.

2. The business machine file card marker of claim 1 wherein a transparent member overlaps said tab and is fixed to said marker; said transparent member and tab forming an envelope to receive an identification member facilitating changing identification of said file card marker.

References Cited by the Examiner
UNITED STATES PATENTS

| | | | |
|---|---|---|---|
| 1,310,468 | 7/1919 | Best | 129—16.7 |
| 2,432,493 | 12/1947 | Addington | 129—16.8 |
| 2,515,424 | 7/1950 | Rembold | 129—16.7 |
| 2,786,470 | 3/1957 | Bock | 129—16.7 |
| 2,827,057 | 3/1958 | Feeley | 129—16.7 |

FOREIGN PATENTS 929,110   6/1963   Great Britain.

References Cited by the Applicant
UNITED STATES PATENTS 2,883,989   4/1959   Ulrich.

JEROME SCHNALL, *Primary Examiner.*